United States Patent [19]

Alexander et al.

[11] 4,275,376
[45] Jun. 23, 1981

[54] ELECTRICAL SIGNAL INTERCONNECTION COUPLER

[75] Inventors: William C. Alexander, Barberton; Richard L. Kirk, North Canton; Kenneth A. Thomsen, Akron, all of Ohio

[73] Assignee: Goodyear Aerospace Corporation, Akron, Ohio

[21] Appl. No.: 144,755

[22] Filed: Apr. 28, 1980

[51] Int. Cl.³ .............................................. B60C 23/00
[52] U.S. Cl. ................................. 340/52 R; 340/27 R; 340/58; 340/682
[58] Field of Search .................. 340/52 R, 52 F, 58, 340/671, 679, 682, 27 R

[56] References Cited

U.S. PATENT DOCUMENTS

| | | | |
|---|---|---|---|
| 2,063,452 | 12/1936 | McDonnell | 340/58 |
| 2,797,273 | 6/1957 | Brodsky | 340/58 |
| 2,966,650 | 12/1960 | Earnest | 340/58 |
| 4,063,786 | 12/1977 | Rall | 340/682 |
| 4,151,655 | 5/1979 | Makarainen | 340/58 |

*Primary Examiner*—Alvin H. Waring
*Attorney, Agent, or Firm*—P. E. Milliken; L. A. Germain

[57] ABSTRACT

A signal communicator for transmitting an electrical signal from one member rotating relative to another member is in the configuration of a journal bearing and comprises at least one conically shaped annular graphite ring supported by inner and outer electrically conductive races. While one race is insulatively mounted on the rotating member and electrically connected to a condition sensor, the other race is insulatively mounted on the relatively stationary member and electrically connected to a signal detector, and the graphite ring is an electrical conductor interconnecting the sensor and detector via the two races. Alternatively, two opposing and contacting graphite rings are mounted in nonconducting carriers, one of the carriers keyed for rotation with the sensor while the other is mounted on the relatively stationary member. Electrical connections are made directly from the sensor to one of the graphite rings and from the detector to the other of the graphite rings and the rings therefore function as the electrical interconnection between the rotating sensor and the relatively stationary detector.

35 Claims, 7 Drawing Figures

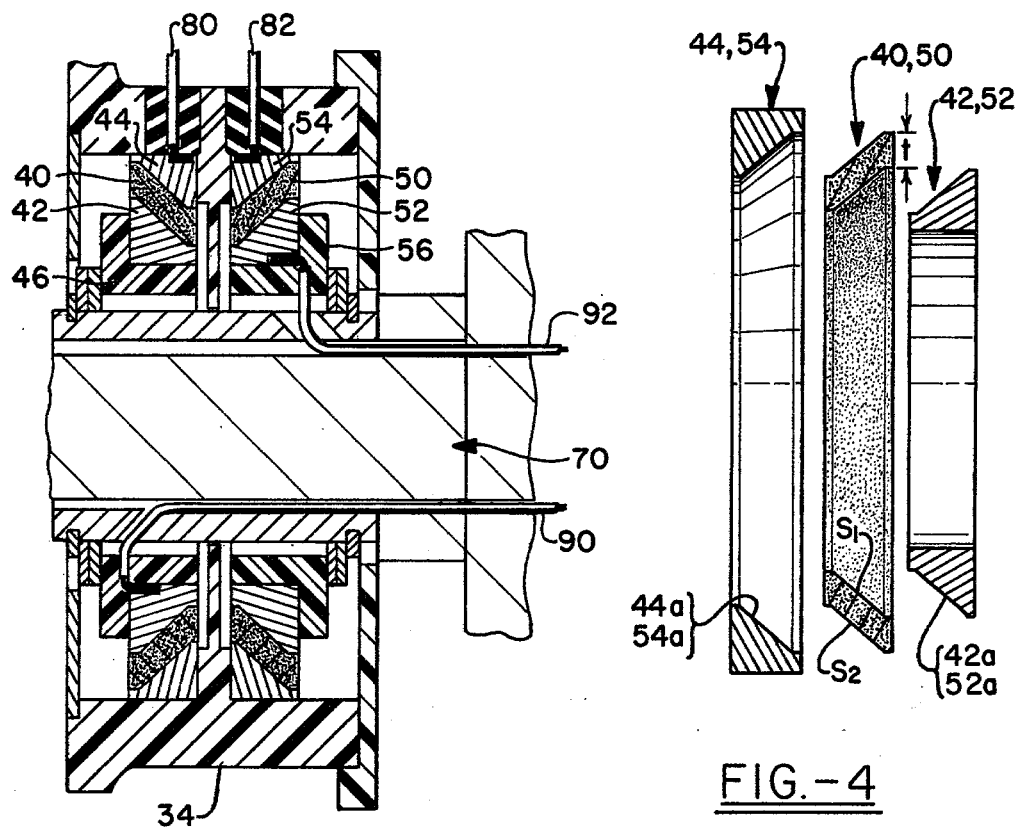
FIG.-3
FIG.-4
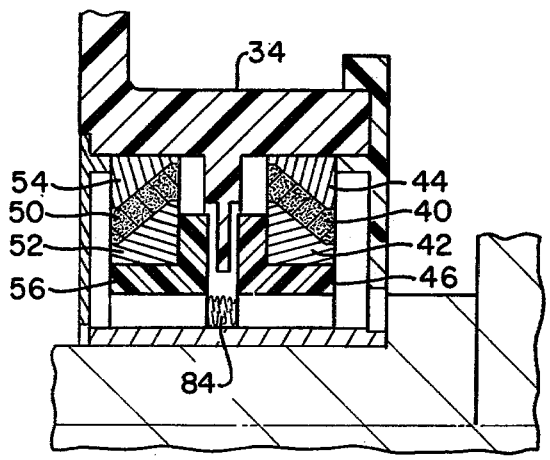
FIG.-5
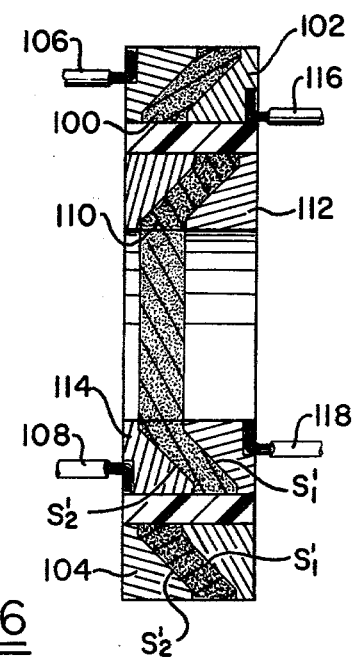
FIG.-6

ELECTRICAL SIGNAL INTERCONNECTION COUPLER

BACKGROUND OF THE INVENTION

This invention generally relates to electrical communication devices and more particularly to devices for transmitting an electrical signal from a condition monitoring sensor mounted on a first member moving rotationally relative to a signal detector mounted on a second member. While in its broadest scope the invention may be applied to other fields, it is herein specifically described with respect to aircraft applications wherein it is desired to transmit pressure, temperature, and/or speed information signals from a rotating wheel to an electronic detector mounted on the landing gear strut. The signals of interest are ultimately transmitted to the cockpit via the aircraft wiring for pilot observance of an indicated condition.

The term "signal communicator" as used herein is broadly defined and is a device that functions as a mechanical coupler, contactor, or interconnector for conveying, passing, or transmitting an electrical signal between two members, one of the members moving relative to the other member.

In the field of monitoring for a sensed condition occurrence on a first member moving rotationally with respect to a second member, the interface between the two relatively moving members has always posed a particular problem. Solution of the problem in some applications involved elaborate mechanical configurations of carbon brushes contacting rotating armatures and in other applications it involved electrical coupling techniques including inductive, capacitive, and/or impedance coupling configurations. While these techniques have met with some success in various limited applications, they have not been altogether successful in the aircraft environment wherein extremes of pressure, temperature, and/or corrosion are experienced. In an aircraft application and other similar type applications wherein public safety are a matter of concern, it is not only important that the primary apparatus and equipment function reliably, but it is equally important that the devices which monitor such operation function reliably. To this end, the present invention provides a signal communicator that is substantially insensitive to the environment, simple in operation, compact, failsafe, and exhibits long wear and reliability over its intended life expectancy.

SUMMARY OF THE INVENTION

The present invention, in its broadest scope, is a signal communicator in the form of a journal bearing comprised of an annular graphite ring supported by inner and outer electrically conductive races. When one race is insulatively mounted on the rotating member and electrically connected to the condition sensor and the other race is insulatively mounted on the relatively fixed member and electrically connected to the signal detector, the graphite ring is a conductor electrically interconnecting the sensor and detector via the two races. Alternatively, two opposing and contacting annular graphite rings may be supported in non-conductive carriers, one of the rings being keyed for rotation with the rotating member and electrically connected to the condition sensor while the other is keyed to the relatively fixed member and electrically connected to the signal detector. The contacting graphite rings therefore function as the electrical interconnection between the rotating sensor and relatively fixed detector.

BRIEF DESCRIPTION OF THE DRAWINGS

The invention will be better understood from the following detailed description when considered in conjunction with the accompanying drawings in the several figures of which like reference numerals identify like elements and in which:

FIG. 3 is an elevational view, in section, of the configuration of FIG. 2 rotated to show the wiring connections;

FIG. 4 is an assembly showing of the principal elements forming the signal communicator;

FIG. 5 is a partial elevational view, in section, similar to FIG. 3 illustrating a second configuration of the invention;

FIG. 6 is a partial elevational view, in section, illustrating a third configuration of the invention.

DETAILED DESCRIPTION OF THE INVENTION

Figures 1, 2:
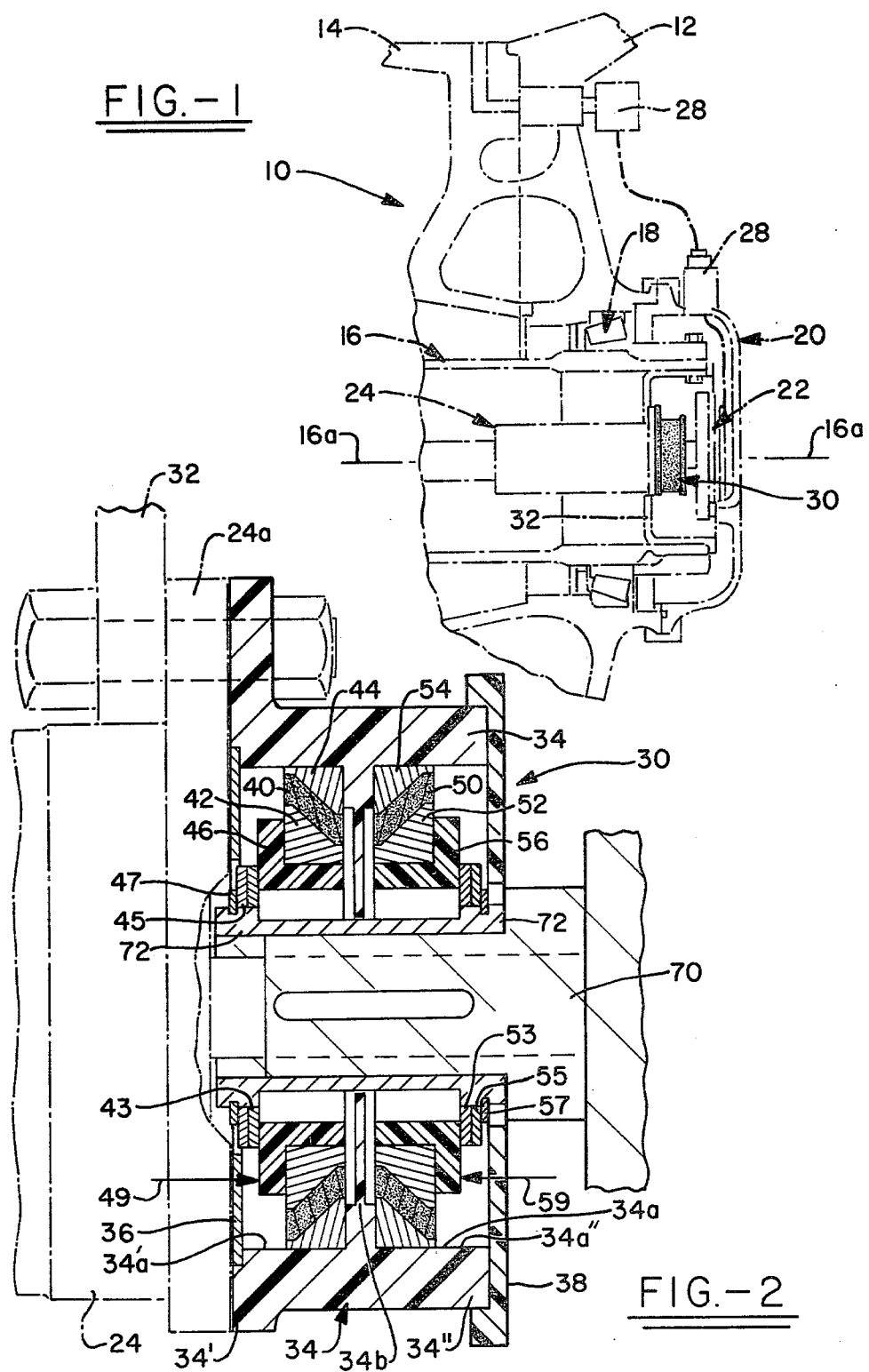
FIG. 1 is an elevational view illustrating via a ghost line showing a particular environment for the invention as it is described herein.
FIG. 2 is an elevational view, in section, illustrating a first configuration for the signal communicator comprising the invention.

FIG. 1 illustrates, by way of example, the environment of the invention as it may be applied to an aircraft wheel assembly generally indicated by reference numeral 10 wherein it is desired that signals generated on the rotating wheel be transmitted to the relatively stationary axle portion of the aircraft and thereafter to the cockpit for display of the monitored condition. The assembly 10 is not considered to limit the extent of the applications for the inventive concept described herein and therefore the illustration is in ghost line showing and generally comprises wheel halves 12 and 14, an axle 16, wheel bearings 18, and a hubcap 20. The hubcap 20 houses a wheel speed transducer 22 that connects into an antiskid system 24. A tire condition monitor 28 is also provided that generates signals indicative of the tire pressure and/or temperature, which signals are the subject of interest and must be transmitted efficiently across the motion interface between the wheel and axle via the instant invention. In this respect, therefore, a signal communicator 30 is provided that is mounted at the end of the axle 16 and for the purpose of this example is shown mounted at the outboard end of the antiskid system 24 such that signals generated on the rotating wheel may be fed and connected into the communicator 30 and thereafter to the remote display in the aircraft cockpit.

Referring to FIGS. 2 and 3, the signal communicator 30 is shown in an enlarged sectional view as it may be mounted to the outboard end 24a of the aircraft antiskid system 24 which in turn is mounted via a bracket 32 to the wheel axle 16. The communicator 30 comprises an electrically non-conductive housing 34 having a bore 34a carrying a seal 36 at its inboard end 34' and an end cap or dust cover 38 at its outboard end 34". Referring also to FIG. 4, the operational elements of the communicator 30 essentially comprises a pair of identical annular graphite rings 40 and 50, each of which is in the configuration of a truncated cone having a wall thickness "t" within the range of 0.03 to 0.09 inches (0.76–2.29 mm) and characterized by an inner tapering surface $S_1$ and an outer tapering surface $S_2$. The angle of the taper may vary between 20–70 degrees and is not determinative of the operational characteristics thereof.

The graphite ring 40 is supported by an inner race 42 and an outer race 44 while the graphite ring 50 is supported by similar inner and outer races 52 and 54 respectively. The inner faces 42,52 have outward facing surfaces 42a,52a that are complimentary to the taper of the inner surfaces $S_1$ of the respective graphite rings 40 and 50 while the outer races 44,54 have inward facing surfaces 44a,54a that are complimentary to the taper of the outer surfaces $S_2$ of the respective rings 40,50. The inner races 42,52 are mounted coaxially on L-section electrically non-conductive carriers 46,56 and these are mechanically keyed for rotation with a shaft 70 through a keyed drive tube bushing 72. The shaft 70 interconnects the wheel speed transducer 22 to the antiskid system indicated at 24 in FIGS. 1 and 2.

The housing 34 may be of an electrically non-conductive material or of a metal casting such as aluminum having an electrically non-conductive coating thereon so as to be effectively insulated from the communicator elements contained therein. The housing 34 has a bore 34a that is divided into an inboard facing portion 34a' and an outboard facing portion 34a'' by a partition or wall 34b. Mounted within the inboard bore 34a' is the assembly comprising graphite ring 40, inner race 42, carrier 46, and outer race 44 while mounted within the outboard bore 34a'' is the assembly comprising graphite ring 50, inner race 52, carrier 56, and outer race 54. The partition 34b thus electrically insulates the inboard assembly from the outboard assembly. The inboard assembly is retained in the bore 34a' by a wave spring 43 confined between the L-section carrier 46 and a flat washer 45 that bears against a snap ring 47 mounted in an annular slot in the inboard end of the drive tube 72. In this configuration a force is maintained on the assembly in the outboard direction of arrow 49 to effect an axial preload that is distributed over the conical or annular contact surface area between the races 42 and 44 and the graphite ring 40. In like manner the outboard assembly is retained in the bore 34a'' by a wave spring 53 confined between the L-Section carrier 56 and a flat washer 55 that bears against a snap ring 57 mounted in an annular slot in the outboard end of the drive tube 72. In this configuration a force is maintained on the outboard assembly in the inboard direction of arrow 59 to effect an axial preload that is distributed over the annular contact surface area between the races 52 and 54 and the graphite ring 50.

FIG. 3 illustrates the electrical connections that are made through the communicator 30. Two inputs 80 and 82 that originate on the stationary member (ie. aircraft cockpit) enter the communicator 30 through access openings in the housing 34. Two other inputs 90 and 92 that originate on the relatively movable member (ie. wheel) enter the communicator via access openings along the shaft 70 and/or drive tube 72. Inputs 80 and 82 are connected to outer races 44 and 54 respectively while inputs 90 and 92 are connected to inner races 42 and 52 respectively. In this circumstance it will be readily appreciated that separate electrical paths exist through the communicator 30 by way of inputs 80 and 82 being interconnected to inputs 90 and 92 through respective graphite rings 40 and 50 housed in the inboard and outboard portions of the communicator.

FIG. 5 illustrates an alternative configuration wherein the inboard and outboard assemblies are reversed in their mounting in the housing 34. In this configuration, the carriers 46,56 are also reversed and a wave spring 84 is positioned between the two such as to effect axial load forces that are distributed over the annular contact surface area between the graphite rings 40,50 and the inner and outer races 42,52 and 44 and 54 respectively.

FIG. 6 illustrates a configuration wherein the races are oriented in an inboard/outboard arrangement. In this configuration a pair of truncated cone graphite rings 100, 110 having different diameters are positioned coaxially in a vertical arrangement. The inner contact surfaces $S_{1'}$ of the graphite rings are in mating contact to respective conductor races 102,112 while outer contact surfaces $S_{2'}$ are in mating contact with respective conductor races 104, 114. It will be readily appreciated that either pair of races 102,112 or 104,114 may be designated the rotating pair while the opposite pair will be the stationary pair. In this respect therefore, assuming that the inner races 102,112 are in a manner keyed for rotation with a rotating member, the opposite races 104,114 will be mounted on the stationary member. In the application of the configuration to an aircraft wheel the races 104,114 will be mounted at the inboard position and electrical leads 106,108 will provide connection into the communicator from the remote display device in the cockpit. Similarly, the races 102, 112 will be mounted at the outboard position and keyed for rotation with the wheel and hub assembly and electrical leads 116,118 will provide connection into the communicator from the condition monitor mounted on the rotating wheel. Thus, it will further be appreciated from the foregoing, that the communicator configuration of FIG. 6 will provide signal transmission through a mechanical device meeting very limited space requirements.

In the context of a tire condition monitoring system the generated signal indicative of the monitored condition varies according to a varying resistance and therefore the signal communicating device 30 must operate with a constant and low level resistance and with little or no electrical noise during rotating and/or non-rotating conditions. In this circumstance, the races 42,52 and 44,54 are made of copper, stainless steel or other metal having excellent electrical and thermal conductivity and the rings 40,50 are of a carbon graphite material exhibiting a low specific resistance value of not more than 0.0010 ohms per cubic inch and preferably of not more than 0.0006 ohms per cubic inch. While the graphite rings are brittle in nature, their being supported by metal races at the tapered annular surfaces $S_1$ and $S_2$ results in an integral unit exhibiting radial strength and an excellent surface-to-surface electrical contact. Furthermore, a notable long wear feature of the graphite pertains to one of its inherent material properties. For example, as the conical contact surfaces 42a,52a and 44a,54a of the metal races rub on the conical graphite surfaces $S_1,S_2$ of the rings 40,50 a very smooth, highly polished silvery scale forms therebetween which further improves the surface-to-surface contact for continued low electrical resistivity. This also lowers the frictional forces of the metal race rubbing on the graphite with lower temperatures and longer wear life resulting. It will be appreciated from the foregoing discussion that because the contact surfaces are total annular or conical surfaces, the metal race surface is never allowed to tarnish or build up a scale. In actual operation of copper races it was found that the copper surfaces were actually impregnated with graphite particles which resulted in continued low electrical and mechanical resistivity during the expected life of the communicator.

Figure 7:
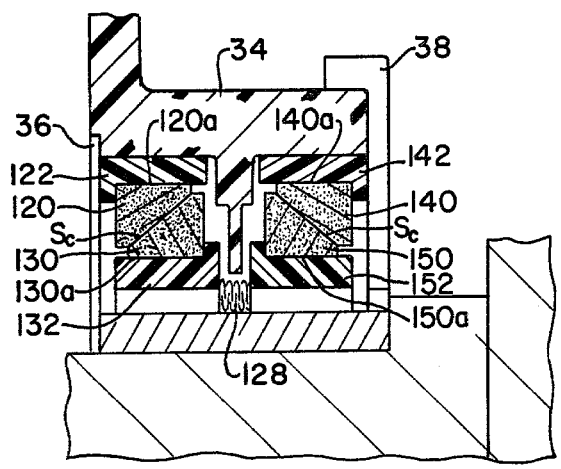
FIG. 7 is a partial elevational view, in section, illustrating a fourth configuration of the invention.

FIG. 7 illustrates an alternative embodiment wherein carbon graphite rings 120,130 and 140,150 are provided which are sufficiently massive to eliminate the conductive metal races of the previously described embodiments. In this circumstance, the rings are formed withh keyways about their annular outer surfaces 120a,130a and 140a,150a such that they may be mounted about an axis of rotation to respective portions of a wheel/axle assembly. For example, electrically non-conductive carriers 122,132 and 142,152 may be provided on the respective rotating and non-rotating members and these may be loaded by a spring 128 to effect a constant force about the annular contact suface $S_c$ that exists between two rings. In this configuration, electrical connections are made from the sensor means on the wheel to graphite rings 130,150 and electrical connections are made from the detector on the non-rotating member to graphite rings 120,140, and the tapered contact surfaces $S_c$ provide the electrical interconnection between the two members.

It is anticipated that in all of the beforementioned embodiments of the invention each of the graphite rings 40,50,100,110,120,130,140 and 150 may be mounted as multiple rings. For example, graphite ring 40 may be comprised of two rings nested one within the other and allowed to rotate freely between the supporting races 42,44. In this configuraton, any axial misalignment of the elements comprising the signal communicator may be taken up by "wearing-in" of the carbon graphite. It will be appreciated from this and the foregoing discussion that the annular and conical arrangement of the signal communicator insures a large real area of electrical contact and provides for even contact force distribution which are both necessary to the absence of electrical noise. Thus, the invention provides a signal communicator that accomodates a wide range of electrical current and exhibits low noise electrical signal transmittance in conjunction with low resistivity in a compact, mechanically simple, and reliable device.

While certain representative embodiments and details have been shown for the purpose of illustrating the invention, it will be apparent to those skilled in this art that various changes and modifications may be made therein without departing from the spirit or scope of the invention.

What is claimed is:

1. A signal communicator for transmitting an electrical signal from one member rotating relative to another member comprising:
    a first substantially cylindrical electrically conductive metal race having a bore that tapers radially inwardly for the approximate width of the race;
    a second substantially cylindrical electrically conductive metal race positioned coaxially within the bore of the first metal race and having an outer surface that tapers radially outwardly for the approximate width of the race; and
    at least one conically shaped carbon graphite ring positioned coaxially between the first and second metal races and having an outwardly facing surface in intimate contact with the inwardly tapered bore of the first race and having an inner bore surface in intimate contact with the outwardly tapered surface of the second metal race;
    said communicator being positioned coaxially with respect to the rotating member and receiving electrical signals from the rotating member via electrical connection to one of the races and passing said signal therethrough to the other of the races through the graphite ring and to the other of the members via electrical connection to the other of the metal races.

2. The communicator as set forth in claim 1 wherein the metal races are high conductivity copper.

3. The communicator as set forth in claim 1 wherein the graphite ring exhibits a resistivity of not more than 0.0010 ohms per cubic inch.

4. The communicator as set forth in claim 1 wherein the graphite ring exhibits a resistivity of not more than 0.0006 ohms per cubic inch.

5. The communicator as set forth in claim 1 wherein the tapers of the race surfaces are complimentary.

6. The communicator as set forth in claim 1 wherein the tapers of the race surfaces are not complimentary.

7. The communicator as set forth in claim 1 wherein the angle of the tapered surfaces is within the range of 20–70 degrees.

8. The communicator as set forth in claim 7 wherein the angle of the tapered surfaces is 40 degrees.

9. The communicator as set forth in claim 1 wherein the metal races are comprised of high conductivity stainless steel and the carbon graphite rings exhibit a resistivity of not more than 0.0010 ohms per cubic inch.

10. The communicator as set forth in claim 1 wherein two carbon graphite rings are positioned in a nested relationship between the metal races.

11. The communicator as set forth in claim 1 further comprising at least one additional first metal race insulatively mounted with respect to said original first metal race and at least one additional second metal race insulatively mounted with respect to said original second metal race and at least one additional carbon graphite ring positioned in intimate contact with said additional first and second metal races, said additional first and second metal races being mounted on the rotating member while said original first and second metal races are mounted on the relatively stationary member, said communicator receiving electrical signals from the rotating member via electrical connections to the additional first and second metal races and passing said signals therethrough via the graphite rings and to the other member via electrical connections to the original first and second metal races.

12. In combination with a vehicle wheel and axle assembly having sensing means on the wheel to provide an electrical signal indicative of a particular condition occurrence and detecting means on the axle to receive said signal and transmit it to remote indicating means, a signal communicator mounted coaxially with respect to the wheel and axle for transmitting said signal from the sensing means to the detecting means comprising:
    a first pair of substantially cylindrical electrically conductive metal races mounted coaxially with respect to the wheel and axle and to each other and electrically insulated one from the other, each of said races having a bore that tapers radially inwardly for the approximate width of the race;
    a second pair of substantially cylindrical electrically conductive metal races each positioned coaxially within the tapered bore of one of the other metal races and electrically insulated one from the other, each of said second pair of races having outer surfaces that taper radially inwardly for the approximate width thereof; and a pair of carbon graphite rings, each positioned coaxially between one of a first pair and one of second pair of metal races and having an outwardly facing surface in intimate contact with the inwardly tapered bore and having an inner bore surface in intimate contact with an outwardly tapered surface of said races;

said communicator providing signal transmission therethrough from the wheel to the axle via electrical connections from the sensor means to one of the pair of races and via electrical connections from the detector means to the other of the pair of races.

13. The communicator as set forth in claim 12 wherein the races are comprised of a high conductivity metal and the carbon graphite exhibits a resistivity of not more than 0.0010 ohms per cubic inch.

14. The communicator as set forth in claim 12 wherein the races are comprised of high conductivity copper and the carbon graphite rings exhibit a resistivity of not more than 0.0006 ohms per cubic inch.

15. The communicator as set forth in claim 12 wherein the second pair of races are mounted such as to exert an axial force that is distributed over the annular contact area between the carbon graphite rings and the races.

16. The communicator as set forth in claim 15 wherein one of the second pair of races has an axial force exerted on it that is in an opposite direction to an axial force exerted on the other of the second pair of races.

17. The communicator as set forth in either of claims 15 or 16 wherein the second pair of races are mounted on insulated carriers that are keyed for rotation with said wheel.

18. A signal communicator for transmitting an electrical signal from condition sensing means on a rotating member to signal detecting means on a relatively stationary member comprising:

a first pair of substantially cylindrical electrically conductive metal races mounted coaxially with respect to the rotating member and one within the other and electrically insulated from each other, each of said races having a bore that tapers radially inwardly for the approximate width of the race;

a second pair of substantially cylindrical electrically conductive metal races mounted one within the other and coaxially with respect to the first pair of races and electrically insulated from each other, each of said second pair of races having an outer surface that tapers radially outwardly for the approximate width thereof; and a pair of carbon graphite rings, each positioned coaxially between one of a first pair and one of a second pair of metal races and having an outwardly facing surface in intimate contact with the inwardly tapered bore of one of the first pair of races and having an inner bore surface in intimate contact with an outwardly tapered surface of one of the second pair of races;

said communicator providing signal transmission between the sensing means and the signal detecting means by reason of electrical connection from the sensing means to one of the pair of metal races and electrical connection from the detecting means to the other of the pair of metal races.

19. The communicator as set forth in claim 18 wherein the sensor means is electrically connected to the first pair of races and the signal detecting means is electrically connected to the second pair of races.

20. The communicator as set forth in claim 18 wherein the sensing means is electrically connected to the second pair of races and the signal detecting means is electrically connected to the first pair of races.

21. The communicator as set forth in either of claims 19 or 20 wherein the carbon graphite rings exhibit a resistivity of not more than 0.0010 ohms per cubic inch.

22. The communicator as set forth in either of claims 19 or 20 wherein the metal races are comprised of a high conductivity copper and the carbon graphite rings exhibit a resistivity of not more than 0.0006 ohms per cubic inch.

23. The communicator as set forth in either of claims 19 or 29 wherein the metal races are comprised of high conductivity stainless steel and the carbon graphite rings exhibit a resistivity of not more than 0.0010 ohms per cubic inch.

24. In combination with a vehicle wheel and axle assembly having sensing means on the wheel to provide an electrical signal indicative of a particular condition occurrence and detecting means on the axle to receive said signal and transmit it to remote indicating means, a signal communicator mounted coaxially with respect to the wheel and axle for transmitting said signal from the sensing means to the detecting means comprising:

an electrically non-conductive housing having a bore partitioned such as to form an inboard bore portion and an outboard bore portion; said housing being mounted on the vehicle axle such that the housing bore is coaxial with the wheel and axle assembly;

a first communicator portion mounted within the inboard bore of the housing and comprised of a carbon graphite ring in a conical configuration having a wall thickness "t" supported between a first pair of electrically conductive metal races, one of the races being an outer face having a tapered bore that is in intimate contact with an outer facing surface of the graphite ring, the other of the races being an inner race having an outer tapered surface that is in intimate contact with an inner facing surface of the graphite ring;

a second communicator portion mounted within the outboard bore of the housing and comprised of a carbon graphite ring in a conical configuration having a wall thickness "t" supported between a second pair of electrically conductive metal races, one of the races being an outer race having a tapered bore that is in intimate contact with an outer facing surface of the graphite ring, the other of the races being an inner race having an outer tapered surface that is in intimate contact with an inner facing surface of the graphite ring;

said inner races on the first and second communicator portions being keyed for rotation with said wheel and electrically connected to said sensing means while said outer races of the first and second communicator portions are fixedly mounted within the housing and electrically connected to said signal detecting means.

25. The communicator as set forth in claim 24 wherein the graphite rings have a thickness "t" within the range of 0.03–0.09 inches (0.76–2.29 mm) and exhibit a resistivity of not more than 0.0010 ohms per cubic inch.

26. The communicator as set forth in claim 24 wherein the races are high conductivity copper and the carbon graphite exhibits a resistivity of not more than 0.0006 ohms per cubic inch.

27. The communicator as set forth in claim 24 wherein the races are comprised of high conductivity stainless steel and the carbon graphite exhibits a resistivity of not more than 0.0010 ohms per cubic inch.

28. The communicator as set forth in claim 24 wherein the housing is comprised of cast aluminum having an electrically non-conductive coating thereon.

29. A signal communicator for transmitting an electrical signal from one member rotating with respect to a relatively stationary member comprising:
 a first carbon graphite ring having a bore surface that tapers radially inwardly and mounted coaxially with respect to the rotating member;
 a second carbon graphite ring having a bore coaxial with the first graphite ring and having an outer peripheral surface that tapers radially outwardly, said tapered surfaces of the first and second graphite rings being complimentary and in intimate contact with each other for the width of the rings;
 a first electrically non-conductive carrier secured to the outer periphery of the first graphite ring and keyed to the relatively stationary member; and
 a second electrically non-conductive carrier secured within the bore of the second graphite ring and keyed for motion with said rotating member;
 said electrical signal being transmitted from one member to the other via the intercontacting graphite rings.

30. The communicator as set forth in claim 29 wherein the carbon graphite exhibits a resistivity of not more than 0.0010 ohms per cubic inch.

31. The communicator as set forth in claim 29 wherein the complimentary tapered surfaces of the graphite rings have angles within the range of 20-70 degrees with reference to their axes.

32. The communicator as set forth in claim 31 wherein the angles are 40 degrees.

33. The communicator as set forth in claim 29 wherein the rotating member is a vehicle wheel having sensing means thereon for providing an electrical signal indicative of a particular condition occurrence and the relatively stationary member is an axle having signal detector means thereon for transmitting said signal to remote indicating means, said first graphite ring being electrically connected to said detector means while said second graphite ring is electrically connected to said sensing means, said signal being transmitted from the sensing means to the detector means via the contacting graphite rings.

34. The communicator as set forth in claim 33 wherein the wheel is an aircraft wheel.

35. The communicator as set forth in claim 29 wherein the first carrier is keyed for motion with the rotating member and the second carrier is keyed to the relatively stationary member.

* * * * *

UNITED STATES PATENT OFFICE
CERTIFICATE OF CORRECTION

Patent No. 4,275,376  Dated June 23, 1981

Inventor(s) William C. Alexander, Richard L. Kirk, Kenneth A. Thomsen

It is certified that error appears in the above-identified patent and that said Letters Patent are hereby corrected as shown below:

Claim 23 (Col. 8, line 20)

"29" should read --- 20 ---.

Signed and Sealed this

Thirteenth Day of October 1981

[SEAL]

Attest:

GERALD J. MOSSINGHOFF

Attesting Officer  Commissioner of Patents and Trademarks